(12) United States Patent
Ronning et al.

(10) Patent No.: US 10,675,984 B2
(45) Date of Patent: Jun. 9, 2020

(54) DRIVE SYSTEM AND METHOD FOR VEHICLE EMPLOYING MULTIPLE ELECTRIC MOTORS

(71) Applicant: AMERICAN AXLE & MANUFACTURING, INC., Detroit, MI (US)

(72) Inventors: Jeffrey J. Ronning, Grosse Pointe Farms, MI (US); John Morgante, Sterling Heights, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/054,481

(22) Filed: Aug. 3, 2018

(65) Prior Publication Data

US 2020/0039362 A1 Feb. 6, 2020

(51) Int. Cl.

| | |
|---|---|
| *H02P 6/04* | (2016.01) |
| *B60L 15/20* | (2006.01) |
| *B60L 1/02* | (2006.01) |
| *B60K 17/356* | (2006.01) |

(52) U.S. Cl.
CPC ............ *B60L 15/20* (2013.01); *B60K 17/356* (2013.01); *B60L 1/02* (2013.01); *H02P 6/04* (2013.01); *B60L 2220/12* (2013.01); *B60L 2220/14* (2013.01); *B60L 2240/421* (2013.01); *B60L 2240/423* (2013.01); *B60L 2240/486* (2013.01); *B60L 2260/26* (2013.01)

(58) Field of Classification Search
CPC .................................. B60L 15/20; B60K 1/02

USPC ..................................................... 318/400.11
See application file for complete search history.

(56) References Cited

U.S. PATENT DOCUMENTS

| | | | | |
|---|---|---|---|---|
| 9,260,105 | B2* | 2/2016 | Tolkacz | B60K 6/52 |
| 9,457,658 | B2 | 10/2016 | Knoblauch | |
| 9,789,871 | B1* | 10/2017 | Dlala | B60L 50/50 |
| 2010/0025131 | A1* | 2/2010 | Gloceri | B60G 3/20 |
| | | | | 180/65.28 |
| 2010/0152940 | A1* | 6/2010 | Mitsutani | B60L 50/16 |
| | | | | 701/22 |
| 2011/0213518 | A1* | 9/2011 | Welchko | B60L 15/20 |
| | | | | 701/22 |
| 2016/0264019 | A1* | 9/2016 | Drako | B60L 15/205 |
| 2017/0366112 | A1 | 12/2017 | Zhou et al. | |

FOREIGN PATENT DOCUMENTS

DE    102011056048 A1    6/2013

\* cited by examiner

Primary Examiner — Erick D Glass
(74) Attorney, Agent, or Firm — Burris Law, PLLC (57) ABSTRACT

The present disclosure relates to a drive system for a vehicle. The drive system may have an electronic drive unit (EDU) subsystem including at least one synchronous motor and at least one asynchronous motor, controllable independently from one another. An electronic controller may be used which is responsive to a torque request input signal and configured to control the EDU subsystem. A memory may be included which is operably associated with the electronic controller and configured to store at least one blending map containing information on percentage outputs from the synchronous and asynchronous motors for the electronic controller to select in response to different torque request input signals, the percentage outputs being selected to optimize a characteristic of the EDU subsystem.

19 Claims, 7 Drawing Sheets

DRIVE SYSTEM AND METHOD FOR VEHICLE EMPLOYING MULTIPLE ELECTRIC MOTORS

FIELD

The present disclosure relates to electric drive systems used in electrically driven motor vehicles, and more particularly to an electric drive system and method for controlling a plurality of electronic drive units to optimize an operating characteristic of the electric drive system.

BACKGROUND

The statements in this section merely provide background information related to the present disclosure and may not constitute prior art.

Figure 1:
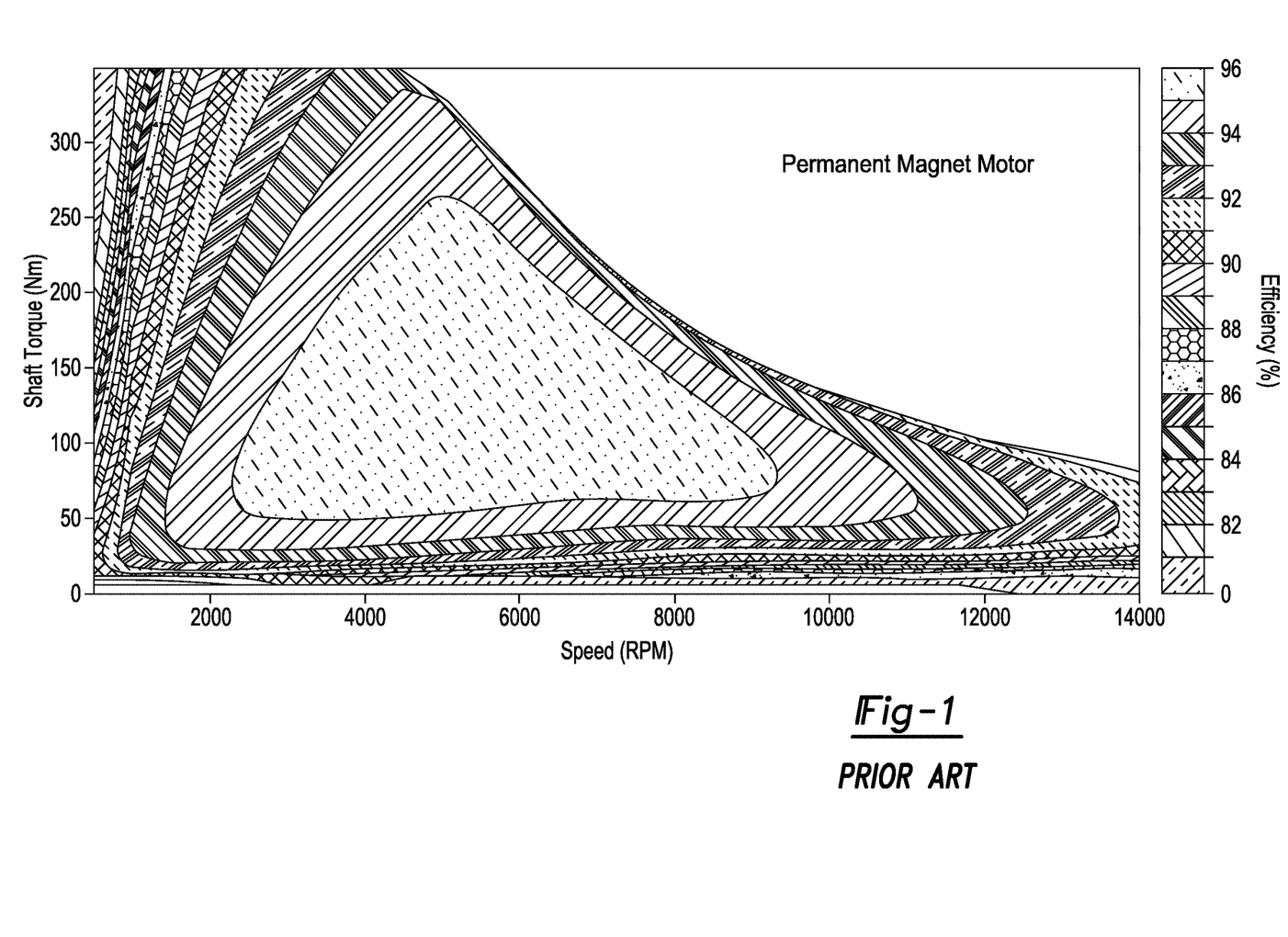
FIG. 1 is a graph of a prior art permanent magnet motor illustrating how its efficiency changes relative to shaft speed and shaft (i.e., output) torque.
Figure 2:
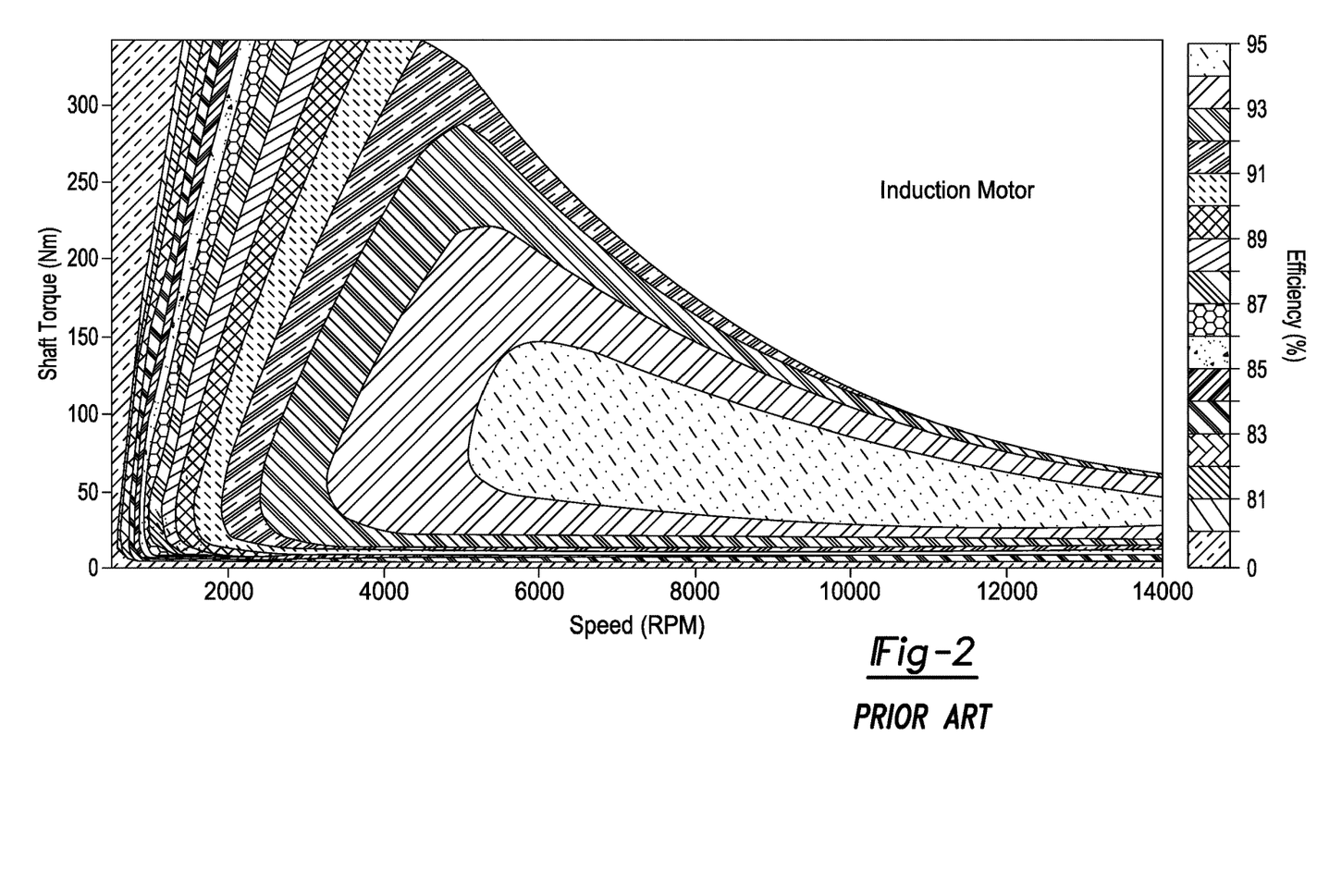
FIG. 2 is a graph of a prior art induction motor showing how its efficiency changes relative to shaft speed and shaft output torque.

The use of electric drive units ("EDUs") in passenger vehicles is gaining rapidly in popularity, owing in part to the increasing interest in reducing the carbon footprint associated with typical four wheeled passenger vehicles, which traditionally have used internal combustion engines for power. In previously developed EDUs, either an induction motor or a permanent magnet ("PM") motor have most typically been used when either supplementing, or supplanting, an internal combustion engine of a vehicle. Induction motors generally provide maximum efficiency at moderate to high rotational speeds and lower output shaft torques. Conversely, a PM motor differs in that its peak efficiency generally occurs at lower to moderate motor shaft speeds, and over a wider output torque range, than an induction motor. FIGS. 1 and 2 provide graphs illustrating how the efficiency of each of a PM motor and an induction motor change with speed and output torque.

With the present day interest in maximizing efficiency and obtaining the maximum driving range of vehicles having an EDU, there is strong focus on developing EDUs that even better meet the needs of maximizing efficiency while providing maximum efficiency over a wider speed range, as well as over a wider output torque range.

SUMMARY

In one aspect the present disclosure relates to a drive system for a vehicle. The system may comprise an electronic drive unit (EDU) subsystem including at least one synchronous motor and at least one asynchronous motor, controllable independently from one another. An electronic controller may be included which is responsive to a torque request input signal and configured to control the EDU subsystem. A memory may also be included which is associated with the electronic controller. The memory may be configured to store at least one blending map containing information on percentage outputs from the synchronous and asynchronous motors. The electronic controller may use the blending map to select, in response to different torque request input signals, specific percentage outputs for each of the motors to optimize a characteristic of the EDU subsystem.

In another aspect the present disclosure relates to a drive system for a vehicle. The drive system may comprise an electronic drive unit (EDU) subsystem. The electronic drive system may include a synchronous motor; a first inverter operably associated with the synchronous motor for controlling the synchronous motor; an asynchronous motor; and a second inverter operably associated with the asynchronous motor for controlling the asynchronous motor. The electronic drive system may further include an electronic controller responsive to a torque request input signal and configured to control the EDU subsystem. A transmission subsystem may also be included which has a front axle and a rear axle. Each of the front and rear axles may be responsive to output signals from the EDU subsystem. The electronic drive system may further include a memory in communication with the electronic controller and configured to store at least one blending map containing information on percentage outputs from the synchronous and asynchronous motors. The blending map may be accessible and used by the electronic controller to select, in response to different torque request input signals, specific percentage outputs from each motor to optimize a characteristic of the EDU subsystem.

In still another aspect the present disclosure relates to a method for forming a drive system for a vehicle. The method may comprise using an electronic drive unit (EDU) subsystem including a first electric motor and a second electric motor to drive a transmission subsystem of the vehicle, where the first and second electric motors have differing operating characteristics. The method may further include controlling the first and second electric motors such that outputs from each are used simultaneously, with a predetermined percentage of output of each motor, to drive the transmission subsystem of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
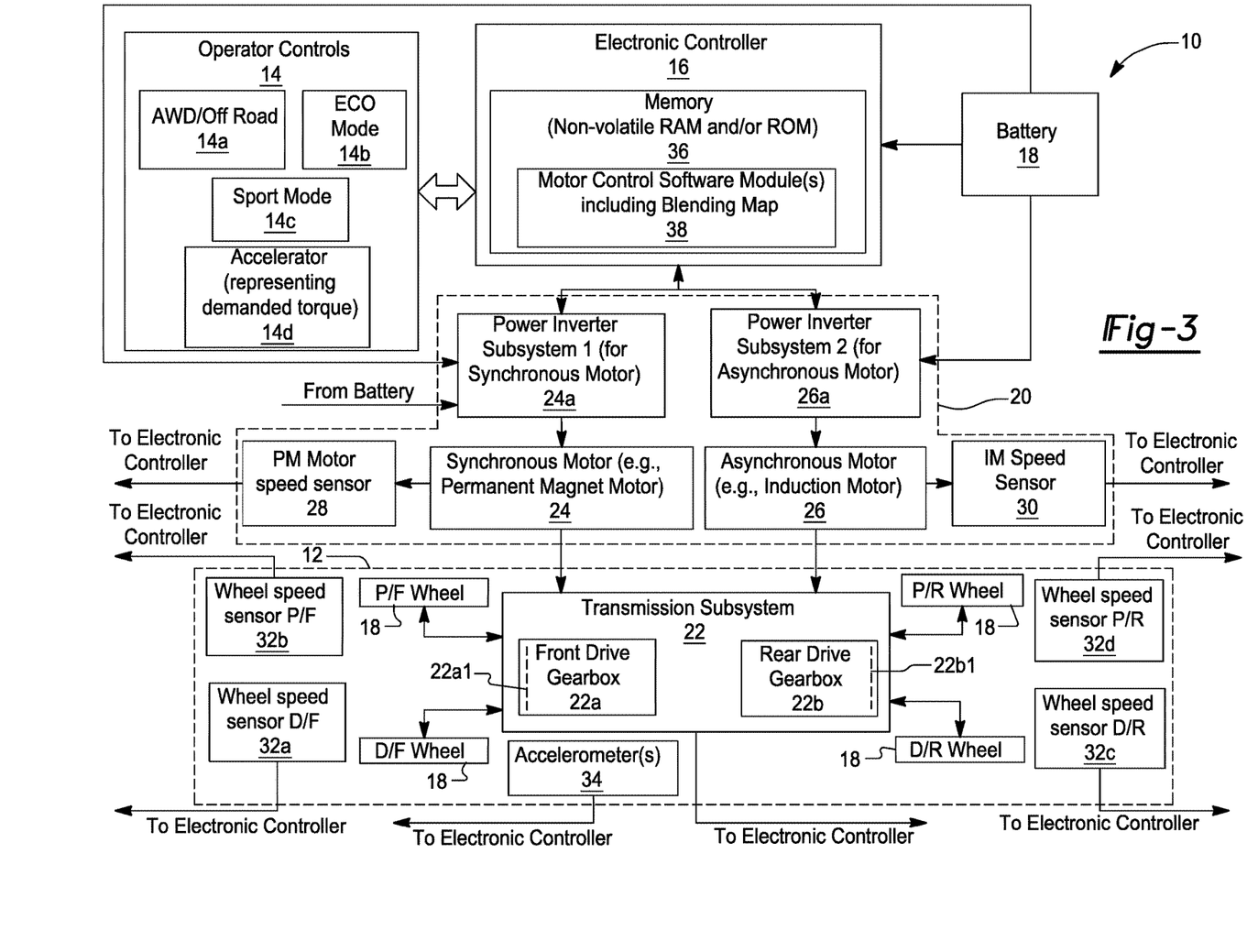
FIG. 3 is a high level block diagram of one embodiment of a system in accordance with the present disclosure which makes use of a pair of electric drive units, where one includes a synchronous motor and the other includes an asynchronous motor, and both motors in this example are controlled in accordance with at least one "blending" map which controls the percentage output of each to achieve a desired performance characteristic, which in one example is maximum efficiency.

Referring to FIG. 3, a drive system 10 in accordance with one embodiment of the present disclosure is shown. The drive system 10 shown in this example is implemented in connection with a four wheeled passenger vehicle 12, although it is not limited to traditional passenger vehicles. The system 10 is equally applicable to commercial vehicles such as trucks, and may also find utility in other applications, for example in connection with farm equipment, earth moving equipment, marine vessels and possibly even aircraft.

The drive system 10 broadly includes a group of operator controls 14, an electronic controller 16, a battery 18 for powering various electrical components of the system 10, an EDU subsystem 20 controlled by the electronic controller 16, and a transmission subsystem 22 driven by the EDU subsystem for providing motive force to wheels 18 of the vehicle 12. In this example the transmission subsystem 22 forms an all wheel drive subsystem and has a front drive gearbox 22a, which drives a front axle 22a1, and an independent rear drive gearbox 22b which is used to independently drive a rear axle 22b. However, it will be appreciated that the vehicle 12 may instead have a two wheel drive subsystem, in which case only a single drive gearbox will be needed, and in that embodiment the EDU subsystem 20 will use the single drive gearbox to drive only two wheels 18 of the vehicle rather than all four wheels. Both embodiments are contemplated by the present disclosure.

The operator controls 14 may include, without limitation, an "All Wheel Drive" ("AWD") or off-road control 14a, an "Economy" ("ECO") or maximum efficiency control 14b, a "Sport Mode" control 14c and an accelerator pedal 14d. The accelerator pedal 14d enables the vehicle operator to generate a torque request signal, which represents a "demanded" torque output from the EDU subsystem 20. It will be appreciated, however, that for an autonomous (i.e., self-driving) vehicle, no accelerator pedal would typically be present. In that case, the torque request signal may be generated by the electronic controller 16 or by a different subsystem of the vehicle. Therefore, it will be appreciated that the drive system 10 is equally applicable to implementation on autonomous vehicles.

The EDU subsystem 20 includes both a synchronous motor 24, for example a switched reluctance motor or a Permanent Magnet motor PM motor 24, as well as an asynchronous motor 26, for example an induction motor. Merely for convenience, these will be referred to throughout the following discussion as "PM motor 24" and "induction motor 26".

The PM motor 24 has its own power inverter 24a for controlling the PM motor, while the induction motor 26 likewise has its own power inverter 26a for controlling the induction motor. Each of the PM motor 24 and the induction motor 26 may be used alone or simultaneously together to drive the front drive gearbox 22a and/or the rear drive gearbox 22b of the transmission subsystem 22. In one configuration both of the PM motor 24 and the IM motor 26 simultaneously provide torque, through the transmission subsystem 22, to drive both of the front drive gearbox 22a and the rear drive gearbox 22b, while in another configuration the PM motor 24 may be used to drive one of the drive gearboxes 22a or 22b (e.g., the front axle 22a1 associated with the front drive gearbox 22a) while the induction motor is used to drive the other drive gearbox (e.g., the rear axle 22b1 associated with the rear drive gearbox 22b), or vice versa. In one embodiment the PM motor 24 and the induction motor 26 may provide the same power output, while in other embodiments the power outputs of the two motors could be different. For example, for a sports car with an all wheel drive transmission subsystem, the power output from the motor 24 or 26 selected to drive the rear wheels could be selected to have a higher power output from the wheels. Conversely, for a sedan or off-road type vehicle, the motor 24 or 26 selected to drive the front wheels could be selected to have a higher power output. Accordingly, the motors 24 and 26 could be selected to have different power levels to best suit the anticipated requirements of the vehicle. With continued reference to FIG. 3, the EDU subsystem 20 may also include a PM motor speed sensor 28 to sense the speed of the PM motor 24, while an induction motor (IM) speed sensor 30 may be used to sense the speed of the induction motor 26. Both of the sensors 28 and 30 may supply their signals to the electronic controller 16 or to other subsystems of the drive system 10 if needed.

Each wheel 18 of the vehicle 12 may also include a wheel speed sensor 32a-32d, for detecting a real time speed of each wheel during operation of the vehicle 12. The wheel speed sensors 32a-32d may each supply a real time signal to the electronic controller 16 which the electronic controller may use to help control the EDU drive subsystem 20. Optionally, one or more accelerometers 34 may be included on the vehicle 12 to provide real time acceleration signals to the electronic controller 16.

The electronic controller 16 may include a memory (e.g., non-volatile memory) 36, which may be RAM, ROM, DRAM, etc. The memory 36 may be used to store one or more blending maps 38 for use by the electronic controller in controlling the PM motor 24 and the induction motor 26 to achieve a desired performance (e.g., maximum efficiency, "sport" mode operation or off-road operation).

Figure 4:
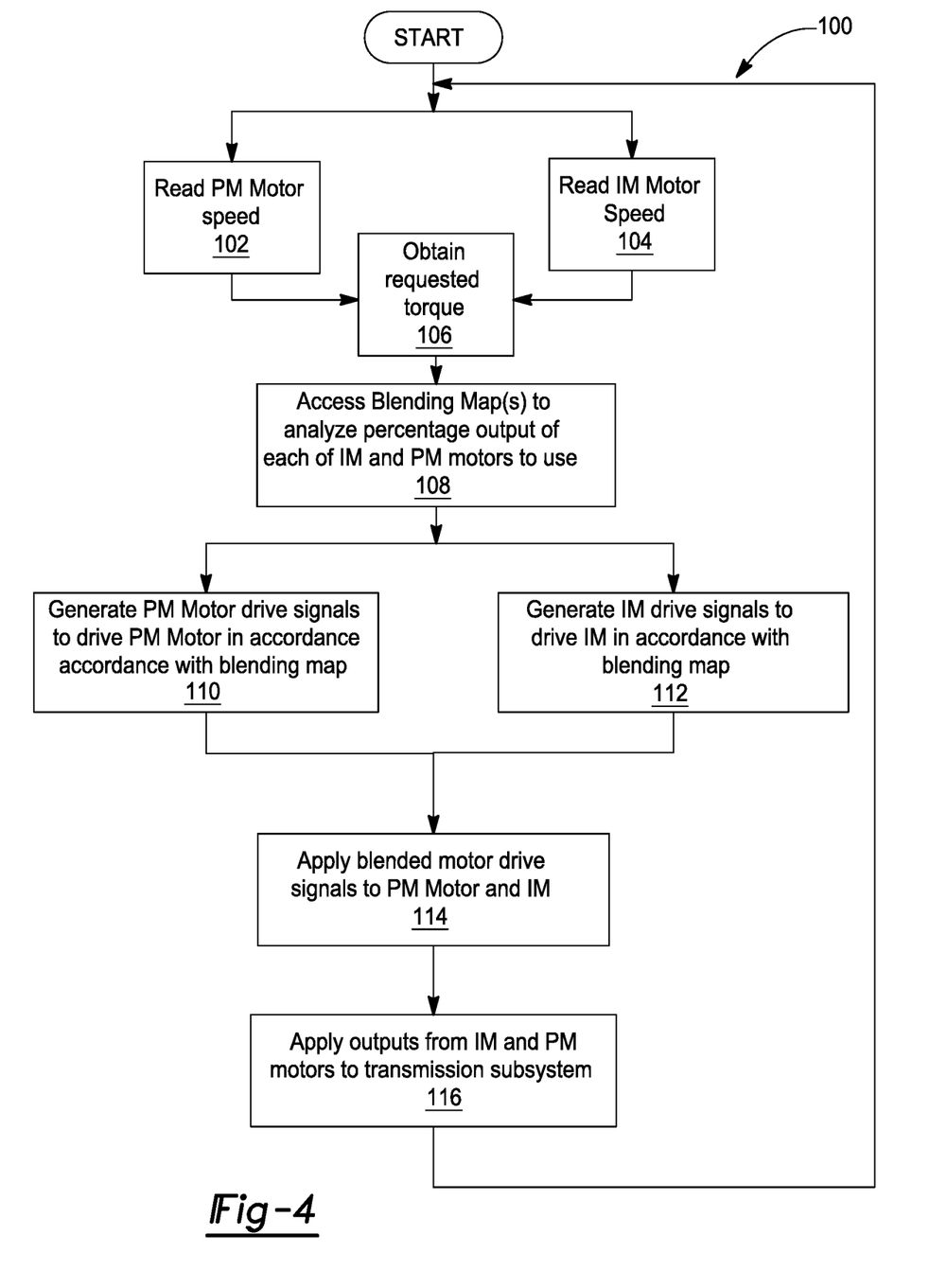
FIG. 4 is a high level flowchart of operation of the system shown in FIG. 3.

Referring to FIG. 4, a flowchart 100 is shown illustrating various operations that may be performed by the drive system 10 of FIG. 3. Initially, the PM motor speed is read by the electronic controller 16 using the PM motor speed sensor 28 at operation 102. Virtually simultaneously, the electronic controller 16 reads the induction motor speed via the IM speed sensor 30, at operation 104. The electronic controller 16 then may obtain the requested torque, which is represented by the accelerator pedal 14d position, as indicated at operation 106.

At operation 108 the electronic controller 16 accesses the appropriate, stored blending map(s) 38 in software, to determine the percentage of each of the PM motor 24 and the induction motor 26 to use in generating a combined (i.e., composite) output control signal. At operations 110 and 112, the PM power inverter subsystem 24a and the induction motor power inverter subsystem 26a use the output control signals to control the PM motor 24 and the induction motor 26 as needed to generate the desired percentage output from each motor. The desired percentage output is that precise percentage output from each motor in accordance with the specific blending map (i.e., Efficiency, Sport or Off-Road) that is being accessed (i.e., which has been selected by the operator). The drive signals from the PM motor 24 and the induction motor 26 are then applied to the transmission subsystem 22, at operation 116, and used to independently drive the axles 22a1 and 22b1 associated with the independent drive gear boxes 22a and 22b, respectively. Optionally, as noted above, the outputs from the PM motor 24 and the induction motor 26 may be used to together to drive a single gearbox, if the vehicle uses a two wheel drive transmission subsystem.

As the vehicle 12 travels, the wheel speed sensors 32a-32d may be used to independently monitor the speed of each wheel 18. Outputs from the wheel speed sensors 32a-32d may be used to further adjust the outputs from the PM motor 24 and the induction motor 26, if needed, and depending on the operating mode (i.e., Efficiency, Sport or Off-road) that the operator has selected for the vehicle 12. After operations 116 and 118 are performed, then at the next clock cycle of the electronic controller 16 (e.g., a set number of milliseconds later) operations 102-118 are repeated to update the outputs from the PM motor 24 and the induction motor 26.

Figure 5:
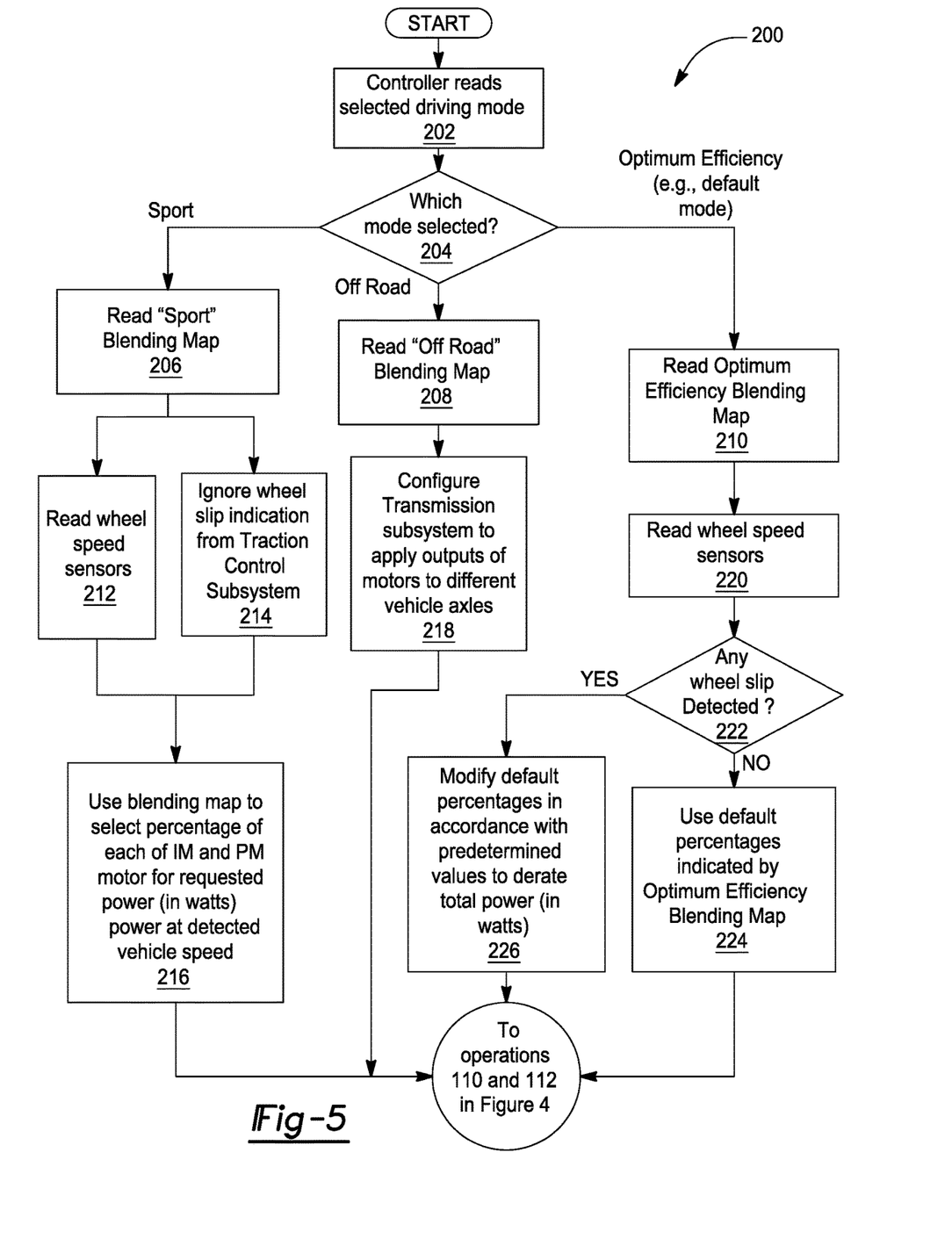
FIG. 5 is a high level flowchart illustrating in greater detail one example of the operations that may be performed when accessing the blending map(s) in FIG. 4.

Referring now to FIG. 5, a more detailed flowchart 200 is shown presenting one specific example as to how various operations may be performed by the electronic controller 16 in controlling the EDU subsystem 20. The flowchart 200 expands on various operations that may be performed at operation 108 in FIG. 4.

Initially at operation 202, the electronic controller 16 reads the driving mode selected by the operator. At operation 204 the electronic controller 16 determines which one of, in this example, the three distinct operating modes, have been selected. If the Sport mode has been selected, then the electronic controller 16 reads the sport mode blending map 206. If the Off-Road mode has been selected, then the Off-Road blending map is read at operation 208. If the Efficiency mode has been selected, then the Efficiency blending map is read at operation 210. In this example the Efficiency mode has been pre-programmed as the "default" mode. So if the operator does not make a selection via any one of the mode controls 14a, 14b or 14c, then the electronic controller 16 will automatically use the Efficiency mode to control the EDU subsystem 20.

If the Sport mode blending map has been read at operation 204, then the electronic controller 16 may read the wheel speed sensors 32a-32d, as indicated at operation 212, and optionally may ignore the wheel slip occurring at any of the wheels 18 of the vehicle 12, as indicated at operation 214. At operation 216 the electronic controller 16 may use the Sport mode blending map to obtain a percentage output from each of the PM motor 24 and the induction motor 26 to apply a selected torque. So in this instance, the delivery of the selected torque (in shaft watts output) may necessitate using percentages of one or both motors 24 and 26 that provide well less than maximum efficiency. As a further example, the transmission subsystem 20 may be controlled so that when in the Sport mode, and during a partial pedal position of the accelerator pedal 14d, the load is biased towards whichever motor powers the rear axle 22b1. As an extreme case, at roughly 50% accelerator pedal 14d position, the motor 24 or 26 driving the rear axle 22b1 could be at full output and the other motor powering the front axle 22a1 could be at a very low output level, for example putting out almost no torque. More likely, however, it is anticipated that a smooth blend-in from possibly about 30% accelerator pedal 14d position to about 70% accelerator pedal position may be preferred when increasing the bias of torque being applied to the rear axle 22b1.

Figure 7:
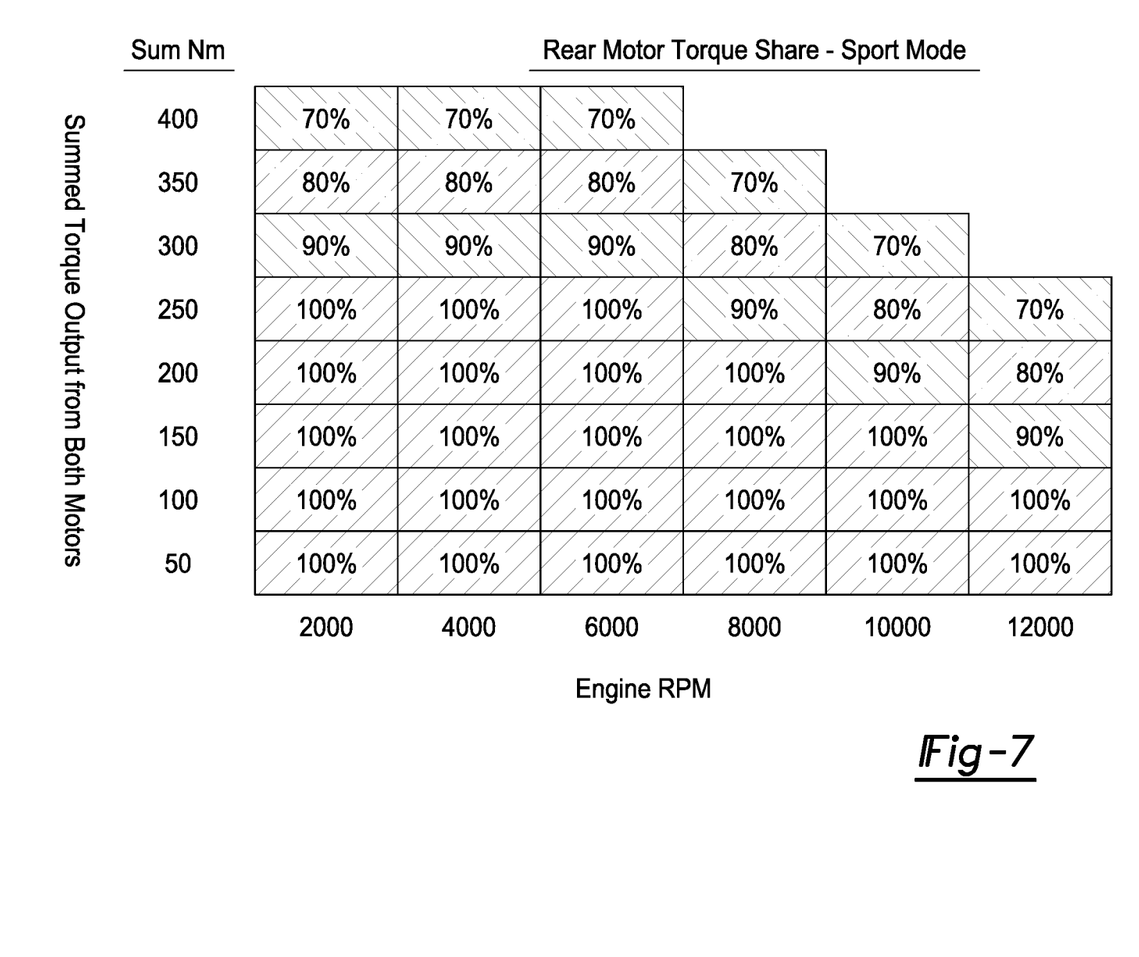
FIG. 7 is one example of a "Sport" mode blending map that may be used in controlling the percentage of the total torque output to a designated one (e.g., rear) of the two motors.

One example of the Sport mode blending map is shown in FIG. 7. The percentages shown in FIG. 7 may be used for each of the PM motor 24 and the induction motor 26 when controlling the EDU subsystem 20 to provide outputs to the motors 24 and 26 while the Sport mode is in use. It will also be noted in the Sport mode, the percentage of the total torque being applied by the rear motor (e.g., the induction motor 26 in this example) varies with both the total torque being demanded as well as the motor RPM. As motor RPM goes up, the maximum of 100% torque from the rear motor (e.g., the induction motor 26) is reached sooner.

If the Off-road mode has been selected, the Off-Road mode blending map will be read by the electronic controller 16 at operation 208, and the EDU subsystem 20 will be controlled so that torque is applied evenly through the separate front and rear drive gearboxes 22a and 22b to the front axle 22a1 and the rear axle 22b1, respectively, of the vehicle simultaneously. In this mode the wheel speed sensors 32a-32d may optionally be ignored as well. The transmission subsystem 22 may be electronically configured such that the full output of one motor, for example the PM motor 24, is applied to one axle 22a1 or 22b1, for example the front axle 22a1 of the vehicle, while the induction motor 26 applies its output to the rear axle 22b1, as indicated at operation 218. If the Efficiency mode has been selected, or if the user has not selected a mode after initially starting the vehicle 12, then in this example the Efficiency mode will automatically be used by the electronic controller 16. At operation 210 the electronic controller 20 will read the Efficiency mode blending map, then optionally may read the wheel speed sensors 32a-32d at operation 220, and make a check to detect if there is any wheel slip occurring with any of the wheels 18, as indicated at operation 222. If no wheel slip is occurring, then the percentages provide in the Efficiency blending map may be used, as indicated at operation 224, by the electronic controller 16. If some wheel slip has been detected at operation 222, then at operation 226 the controller 20 may derate or modify the percentages called for in the Efficiency blending map to momentarily reduce the total shaft output (in watts) being provided by both motors. Alternatively, the electronic controller 16 may derate the percentage used of one or the other of the PM motor 24 and the induction motor 26. Derating of a slipping axle may be offset by added equivalent thrust at the other axle for a net zero change in acceleration.

Figure 6:
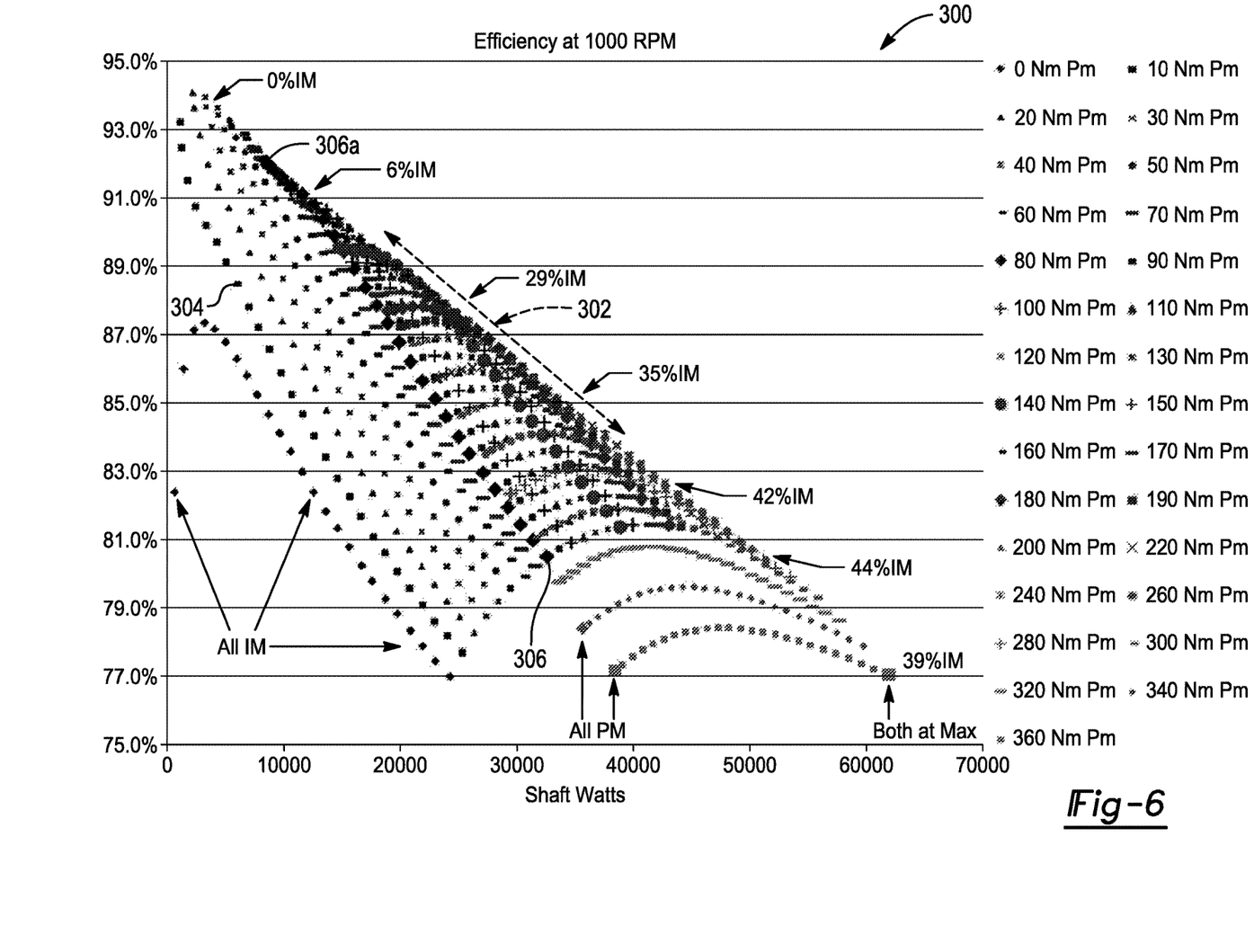
FIG. 6 is one example of an "Efficiency" blending map that may be used by the electronic controller in determining a percentage output of each one of the synchronous and asynchronous motors for a given torque request signal.

FIG. 6 shows one example of graphs illustrating an Efficiency blending map 300. In this example the Efficiency mode blending map 300 shows how efficiency for each of the PM motor 24 and the induction motor 26 changes for various torque outputs. Dashed line 302 in this example provides an optimum "composite" efficiency. The leftmost end of each curve indicates 0% of the induction motor 26 is being used, while the far right end of each curve indicates 100% of the induction motor output being used. So for example, in looking at the 10 Nm curve 304, optimum efficiency of just over 93.0% occurs at 1000 watts motor speed by using essentially only the output of the PM motor 24 and no output of the induction motor 26. That operating point represents the best way to make that particular shaft power, around 1 kW. No other point on any other curve provides higher overall efficiency than that point at 1 kW. If the total shaft output demand is about 10 kW, then there are other curves with better overall motoring efficiency. The diamonds 306 represent 80 Nm of PM motor output and there are points on that curve near 10 kW total combined shaft power (i.e., the output power being generated from the output shafts of both motors 24 and 26) that reside at the leading edge of efficiency. The particular point (point 306a) with best efficiency produces over 91% efficiency and corresponds to a blend of about 6% IM motor torque (94% PM motor torque). As the requirement for more shaft power increases (i.e., along the X axis), it can be seen that the leading edge of efficiency is represented by a stronger blend of the outputs of the two motors 24 and 26, reaching as high as 44% of the combined torque coming from the induction motor 26 near 50 kW shaft power. It can be seen below the leading edge of efficiency that there are several suboptimal torque blend combinations that would produce lower overall efficiency. There is typically only one blend combination for each shaft power requirement that produces the best efficiency.

The system 10 further provides the advantage that the PM motor 24 is a synchronous machine, while the induction motor 26 is an asynchronous machine with different efficiency characteristics. The use of two different types of electric motors simultaneously, enables the elimination of a 2-speed gearbox, that is, the motors can be controlled such that one is predominantly used where low speed and high torque is needed, and then the percentage output of altered for use at higher vehicle speeds during cruise conditions, where torque requirements may be lower, but where efficiency may be more of a concern. The system 10 and method of the present disclosure thus is able to optimize the use of the PM motor 24 and the induction motor 26 to meet the changing speed/torque needs in a manner that maximizes the efficient use of both motors. It will also be appreciated that while the system 10 has been described in connection with one synchronous motor and one asynchronous motor, that the present disclosure is not limited to using only one of each type of motor. For example, two synchronous motors (e.g., two PM motors 24) may be used to drive one pair of wheels 18 of the vehicle 12, or two asynchronous motors (e.g., two induction motors 26) may be used to drive one pair of wheels. Alternatively one motor of one type may be used to drive the front axle of the vehicle and two motors of the other type may be used to drive the other axle. Accordingly, the system 10 is not limited to only the motor configuration shown in FIG. 1, but it is anticipated that the system 10 may be modified, while staying within the scope of the present disclosure, as needed to best suit a specific application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A drive system for a vehicle, comprising:
    an electronic drive unit (EDU) subsystem including at least one synchronous motor and at least one asynchronous motor, controllable independently from one another;
    an electronic controller responsive to a torque request input signal and configured to control the EDU subsystem;
    a memory operably associated with the electronic controller and configured to store at least one blending map containing information on percentage outputs from the synchronous and asynchronous motors for the electronic controller to select in response to different torque request input signals, the percentage outputs being selected to optimize a characteristic of the EDU subsystem; and
    a transmission subsystem responsive to both the synchronous and asynchronous motors for, in one operating mode, providing at least a percentage of torque from each one of the synchronous and asynchronous motors to at least one axle of the vehicle.

2. The drive system of claim 1, wherein the synchronous motor comprises a permanent magnet (PM) motor.

3. The drive system of claim 1, wherein the synchronous motor comprises a switched reluctance motor.

4. The drive system of claim 1, wherein the asynchronous motor comprises an induction motor.

5. The drive system of claim 1, wherein the drive subsystem comprises a first power inverter independently associated with the synchronous motor, and configured to control the synchronous motor.

6. The drive system of claim 1, wherein the drive subsystem comprises a second power inverter independently associated with the asynchronous motor, and configured to control the synchronous motor.

7. The drive system of claim 1, wherein in a different operating mode the transmission subsystem applies outputs from the synchronous and asynchronous motors simultaneously to different axles of the vehicle.

8. The drive system of claim 1, wherein the percentage outputs being selected to optimize a characteristic of the EDU subsystem comprises optimizing efficiency of the EDU subsystem.

9. The drive system of claim 1, wherein the percentage outputs being selected to optimize a characteristic of the EDU subsystem comprises priority biasing of torque from a rear axle of the EDU subsystem.

10. The drive system of claim 1, wherein the percentage outputs being selected to optimize a characteristic of the EDU subsystem comprises optimizing off-road operating ability of the vehicle.

11. The drive system of claim 1, further comprising a plurality of wheel speed sensors for monitoring speeds of a plurality of wheels of the vehicle, and wherein the electronic controller uses said wheel speeds to determine if wheel slip is occurring, and using detected wheel slip to modify the percentages obtained from the blending map.

12. A drive system for a vehicle, comprising:
    an electronic drive unit (EDU) subsystem including:
        a synchronous motor;
        a first inverter operably associated with the synchronous motor for controlling the synchronous motor;
        an asynchronous motor;
        a second inverter operably associated with the asynchronous motor for controlling the asynchronous motor;
        an electronic controller responsive to a torque request input signal and configured to control the EDU subsystem;
        a transmission subsystem including a front axle and a rear axle, each of the front and rear axles being responsive to output signals from the EDU subsystem; and
        a memory in communication with the electronic controller and configured to store at least one blending map containing information on percentage outputs from the synchronous and asynchronous motors for the electronic controller to select in response to different torque request input signals, the percentage outputs being selected to optimize a characteristic of the EDU subsystem; and
        wherein in one operating mode, at least a percentage of an output of both of the synchronous and asynchronous motors is used to by the transmission subsystem to drive at least one of the front or rear axles.

13. The drive system of claim 12, further comprising an operator control in communication with the electronic controller.

14. The drive system of claim 13, wherein the operator control includes at least one of:

an accelerator pedal for enabling an operator of the vehicle to generate the torque request input signal;

at least one control for enabling the user to select between a plurality of different operating modes for the EDU subsystem to implement.

15. The drive system of claim 14, wherein a plurality of blending maps are stored in the memory, each the blending maps being constructed to implement at least one of:

an optimum efficiency mode, in which a percentage output of each of the synchronous and asynchronous motors is used in a manner to optimize overall efficiency of the motors;

a sport mode in which a percentage output of each one of the synchronous motor and the asynchronous motor is used in a manner to prioritize a rear axle output from the rear axle of the transmission subsystem regardless of efficiency; and an off-road mode in which a percentage of only one of the synchronous motor and the asynchronous motor is used to independently drive one of the front and rear axles of the vehicle.

16. The system of claim 15, wherein the blending maps implement each of the efficiency mode, the sport mode and the off-road mode.

17. A method for forming a drive system for a vehicle, the method comprising:

using an electronic drive unit (EDU) subsystem including a first electric motor and a second electric motor to drive a transmission subsystem of the vehicle, the first and second electric motors having differing operating characteristics;

controlling the first and second electric motors such that outputs from each are used simultaneously, with a predetermined percentage of output of each said motor, to drive the transmission subsystem of the vehicle to cause the transmission subsystem to apply a percentage of the outputs from both of the first and second electric motors simultaneously to one axle of the vehicle.

18. The method of claim 17, wherein using first and second electric motors having differing operating characteristics comprises using a synchronous motor as the first motor and an asynchronous motor as the second motor.

19. The method of claim 17, wherein controlling the first and second electric motors such that outputs from each are used simultaneously, with a predetermined percentage of output of each said motor, comprises using a blending map stored in a memory with information on what percentage of each said motor to use, depending on a demanded torque request signal from at least one of a user and a vehicle subsystem.

* * * * *